(12) United States Patent
Roux et al.

(10) Patent No.: US 11,280,499 B2
(45) Date of Patent: Mar. 22, 2022

(54) GLASS-CERAMIC PLATE FOR A WORKTOP OR A PIECE OF FURNITURE

(71) Applicant: EUROKERA S.N.C., Chateau-Thierry (FR)

(72) Inventors: Nicolas Roux, Chateau-Thierry (FR); Pablo Vilato, Paris (FR); Franck Demol, Reims (FR); Gregory Debreyer, Montcourt Fromonville (FR); Michael Ravel, Barzy sur Marne (FR); Bertrand Charpentier, Chateau-Thierry (FR)

(73) Assignee: EUROKERA S.N.C., Chateau-Thierry (FR)

( * ) Notice: Subject to any disclaimer, the term of this patent is extended or adjusted under 35 U.S.C. 154(b) by 460 days.

(21) Appl. No.: 16/095,585

(22) PCT Filed: Apr. 24, 2017

(86) PCT No.: PCT/FR2017/050964
§ 371 (c)(1),
(2) Date: Oct. 22, 2018

(87) PCT Pub. No.: WO2017/187071
PCT Pub. Date: Nov. 2, 2017

(65) Prior Publication Data
US 2019/0128534 A1    May 2, 2019

(30) Foreign Application Priority Data

Apr. 25, 2016    (FR) .................................... 16 53644

(51) Int. Cl.
*F24C 15/10*    (2006.01)
*F24C 7/06*     (2006.01)
*H05B 6/12*     (2006.01)

(52) U.S. Cl.
CPC ............ *F24C 15/108* (2013.01); *F24C 7/067* (2013.01); *F24C 15/102* (2013.01);
(Continued)

(58) Field of Classification Search
CPC ...... F24C 15/102; F24C 15/108; F24C 7/067; H05B 2206/022; H05B 6/1245; Y02B 40/126
(Continued)

(56) References Cited

U.S. PATENT DOCUMENTS 3,976,633 A  *  8/1976  Berkoff ................ A61K 31/655
                                                         534/554
3,978,633 A     9/1976  Scheidler et al.
(Continued)

FOREIGN PATENT DOCUMENTS

EP    1 106 931 A2    6/2001
FR    2 258 353       8/1975
(Continued)

OTHER PUBLICATIONS

English Language Translation of Cited Patent EP1106931 (Year: 2001).*

(Continued)

*Primary Examiner* — Dana Ross
*Assistant Examiner* — Joseph W Iskra
(74) *Attorney, Agent, or Firm* — Oblon, McClelland, Maier & Neustadt, L.L.P.

(57) ABSTRACT

A novel glass-ceramic sheet intended in particular to be used as a surface of a furniture unit or as a worktop, the sheet includes, in at least one of its faces, at least one connection element of a height less than 10 cm and of which the cross section is inscribed inside a circle of a diameter less than 3 cm, the connection element being made from a material able to withstand at least 70° C. and including at least one fixing (Continued)

system allowing fixing along at least two axes or in two movements in particular obtained by at least two different translational or rotational movements or able to exert a force directed toward the glass-ceramic sheet. A worktop or a furniture unit incorporating the sheet, and to a method for mounting accessories or elements that are to be added to said sheet.

16 Claims, 3 Drawing Sheets

(52) U.S. Cl.
CPC ..... *H05B 6/1245* (2013.01); *H05B 2206/022* (2013.01); *Y02B 40/00* (2013.01)

(58) Field of Classification Search
USPC .................................................. 219/452.11
See application file for complete search history.

(56) References Cited

U.S. PATENT DOCUMENTS

| | | | | |
|---|---|---|---|---|
| 5,859,410 | A | * | 1/1999 | White ................ F24C 15/102 219/452.11 |
| 2014/0216435 | A1 | * | 8/2014 | Mallet ................. F24C 7/083 126/211 |

FOREIGN PATENT DOCUMENTS

| | | |
|---|---|---|
| FR | 2 744 201 A1 | 8/1997 |
| FR | 2 980 556 A1 | 3/2013 |

OTHER PUBLICATIONS

International Search Report dated Jul. 25, 2017 in PCT/FR2017/050964 filed on Apr. 24, 2017.

* cited by examiner

GLASS-CERAMIC PLATE FOR A WORKTOP OR A PIECE OF FURNITURE

The present invention relates to a sheet (made) of glass-ceramic, particularly intended to serve as a worktop or a surface (in particular horizontal) of a furniture unit, this sheet in particular being of large dimensions, the invention also relating to the unit thus formed.

Glass-ceramic has been used in particular for several years to form vitreous ceramic hobs, which have been very successful with housekeeping experts, manufacturers of household electrical appliances and users alike, because of their attractive appearance and ease of cleaning.

Worktops themselves are generally made from other materials, for example wood, quartz, Corian®, etc., although the use of glass-ceramic sheets from which to make these worktops, although leading to problem sets specific to that material, is proving particularly attractive.

A glass-ceramic starts out as a glass, referred to as a precursor glass (or parent glass or green-glass), the specific chemical composition of which makes it possible, through suitable heat treatments referred to as ceramization, to bring about controlled crystallization. This partially crystallized specific structure gives the glass-ceramic unique properties.

Each glass-ceramic product is the result of specific studies and numerous tests, given that it is very tricky to make modifications to glass-ceramics and/or to the method by which they are obtained without risking an unfavorable effect on the sought-after properties: for example in its usual duty as a hob, a glass-ceramic sheet generally needs to have transmission in the visible domain that is both low enough to conceal the underlying heating elements at rest, and high enough that the user can visually detect when said elements are in operation, for safety purposes, and/or can read any displays there might be. Glass-ceramic sheets must also have sufficient mechanical strength as required for their use, and in particular and all the more so when they are large in size, and in particular, in the field of household electrical appliances, they must exhibit (as defined for example by standard EN 60335-2-6 for their usual duty as hobs) good ability to withstand pressure, impacts (for supporting, and tolerating the droppage of, utensils, etc.) etc.

In order to fulfill the function or functions assigned to them, glass-ceramic sheets are generally equipped with (decorative or functional) accessories or additional elements needed for their end-purpose (for example with heating elements or with a control strip in the case of hobs), particularly with electronic components, said elements or accessories generally being fixed to the sheet permanently, by being set into a housing provided in the sheet for that purpose and/or possibly by being bonded to a region distinct from the heating regions, where present. The position and choice of accessories are thus fixed in advance, and once the sheet and its accessories are assembled, if an element is defective, the assembly has to be dismantled using special-purpose tooling, or the repair entails exchanging the entire sheet or assembly.

Furthermore, for a sheet of large dimensions, the weight of the glass-ceramic is great and prevents said sheet from being handled easily in the event of problems; as a result, the use of glass-ceramic combined with electronic components from which to make worktops or surfaces of furniture units that are interactive and/or multifunctional presents problems in terms of the fitting or removal of the components, in particular when it is installations of a modifiable nature that are to be created.

The present invention has therefore sought to develop a sheet that allows simpler fitting and removal particularly of electronic equipment, suited to the intended uses of this sheet (in particular in a unit and/or as a worktop), particularly a sheet that allows various types of accessories to be fitted or removed at will without the use of special-purpose tooling and without changing the sheet, it also being possible for the choice of accessories to be made to order, or for accessories to be substituted for other accessories, as desired or as required, thus making it possible where appropriate to obtain an installation that can be modified.

This objective has been achieved by the novel glass-ceramic sheet according to the invention, which is intended in particular to be used as a surface of a furniture unit and/or as a worktop, and which comprises, in at least one of its faces (in particular and advantageously its lower (when in the position of use) face), at least one connection element (or connector) of a height (or thickness) less than 10 cm (preferably less than 6 cm, advantageously less than or equal to 4 cm) and of which the (external) cross section can be inscribed inside a circle of a diameter less than 3 cm (preferably less than 2 cm), said connection element being made from a material able to withstand at least 70° C. (and preferably able to resist at least 120° C.) and comprising at least one part (or fixing system) allowing fixing along at least two axes (in particular obtained by (at least) two different translational and/or rotational movements) and/or (in at least) two movements and/or able to exert a force directed toward (or in the direction of) the glass-ceramic sheet.

The part or system that allows fixing (of an attached element as indicated hereinafter) along at least two axes (in particular obtained by two different translational and/or rotational movements) and/or two movements and/or able to exert a force oriented toward the glass-ceramic sheet, may be formed, or in the form, of a portion, particularly non-customized, of the element, for example a threaded portion or a portion provided with a system (for example of notches) allowing a fixing of the sliding pivot or bayonet type, present for example at the opposite end of the fixing element to the part of said element that is in contact with the glass-ceramic sheet, this portion allowing fixing, particularly along at least two axes and/or in two movements (for example fixing by bayonet or sliding pivot or screw-fastening, obtained in particular by translational and rotational movements) of an attached additional element (which is manufactured separately and then assembled), and/or may be formed of one or more customized component(s), for example distinct from the envelope that forms the element but also forming part of said element, such as a spring inside or on the outside of the envelope forming said element and exerting a force in the direction of the sheet, these elements allowing fixing that is both particularly firm and advantageously removable of attached elements and accessories as detailed and illustrated later.

The present invention also relates to an item of furniture and/or household equipment incorporating the sheet according to the invention, and in particular to a work table (or worktop) or a furniture unit, said item of equipment being formed by at least said sheet (in particular a sheet of large dimensions, particularly having a surface area greater than or equal to 0.7 m², as specified later) positioned (particularly horizontally) on one or more support elements (the carcass of a furniture unit, support leg(s)), so as to offer a stable surface. In particular, the present invention relates to a table or a furniture unit comprising a top or plate, particularly of large dimensions, formed by the sheet according to the invention and able to allow simultaneous or successive performance of various activities and/or supporting of objects. This furniture unit may for example be a central island in a room, for example a kitchen island, or any worktable or worktop for various uses, for example a lab table, a table or a coffee table, or alternatively a unit of the side-table, credenza type, an item of storage furniture, a counter top, etc.

In particular, the invention relates to an item of furniture and/or household equipment in which the sheet occupies most (more than 50% of the surface of the face on which it is located, preferably more than 80%, in particular more 90%) and preferably all (thus forming a continuous surface) of one face of said item of furniture and/or household equipment, particularly the top (when in the position of use), in particular horizontal, face of said item of furniture and/or household equipment, so as to offer a continuous stable surface capable of allowing simultaneous or successive performance of activities (such as work, play, reading, etc.), supporting of objects (such as papers, computers, vases, crockery, etc.), and possibly the preparation or cooking or heating of food in suitable vessels, and/or any other use connected with the purpose for which the unit is intended. The sheet used is particularly and advantageously monolithic and has a thickness less than 15 mm, and a coefficient of expansion less than $30 \times 10^{-7}$ $K^{-1}$ between 20 and 400° C., and a surface area greater than or equal to 0.7 $m^2$, for use as a worktop or a large surface of a furniture unit, as detailed later.

As indicated according to the invention, the glass-ceramic sheet developed comprises at least one, and preferably several, connection element(s) on at least one of its faces (preferably essentially or even only on the lower face (or face that is not visible in the position of use) of the sheet). Each connection element (capable of making the connection with an attached element (which means to say with an element manufactured separately and then assembled), particularly additional element, as explained later) may be made in one or more parts (these parts then being connected and/or assembled to form said element), at least one or more (and advantageously all) of these connection elements with which the sheet is equipped preferably having the external appearance of cylindrical stud(s) or pin(s), where appropriate comprising one or more hollowed parts and/or where appropriate equipped with one or more other external or internal constituent components as explained and illustrated later.

The connection element(s) are advantageously formed, in particular when the sheet is intended to be equipped with heating, particularly inductive heating, elements on at least part (preferably at least half, or all) of their exterior surface, of refractory and/or non-magnetic material(s) able to withstand at least 70° C. and preferably at least 120° C., for example are formed of an external shell (or envelope) (particularly in the form of an at least partially hollow cylindrical stud or pin) made of aluminum or of graphite or of silicon carbide or of vermiculite or refractory fibers, etc.

Advantageously, the sheet comprises several connection elements as defined hereinabove, in particular positioned (more or less uniformly according to need) under the underside of the sheet, particularly distributed across the entirety of the lower face of the sheet.

These elements are, for example, assembled to the sheet using an adhesive, such as an adhesive of the silicone, epoxy or cyanoacrylate type, particularly a thermosetting adhesive advantageously having a coefficient of expansion (measured in accordance with standard ISO11359-2) of less than $900 \times 10^{-7}$ $K^{-1}$ between −40 and 80° C., and a shear strength of at least 1 $N/mm^2$ (measured in accordance with standard ISO4587, on aluminum), and preferably of at least 10 $N/mm^2$. For preference, the adhesive has an expansion coefficient comprised between 500 and $900 \times 10^{-7}$ $K^{-1}$ between −40 and 80° C. and shear strength of the order of 1 to 50 $N/mm^2$, in particular of the order of 10 to 50 $N/mm^2$. This adhesive is preferably an adhesive of the epoxy or cyanoacrylate type. This thermosetting adhesive allows the connectors to be fixed durably while offering a firm bond that offers better resistance to various stress loadings. Recourse to these particular adhesives in order to secure connection elements which themselves allow the desired equipment or accessories to be attached is particularly appropriate and effective, even in any heating regions there might be, while at the same time being simple to implement and economical.

As mentioned previously, the connection element(s) are able to provide connection with an attached element, particularly additional element, whether this is directly an item of equipment or an accessory that is to be fitted or a receptacle capable of accepting various types of equipment or accessory. The small dimensions of the connection elements according to the invention both make it possible for said elements to be positioned at various points on the sheet without presenting problems of space and in order to offer a modifiable structure, and also make it possible for the attached elements to be positioned near the sheet so that they can perform their function while at the same time limiting the risk of damage (scratching of the sheet as a result of potential manipulation of these elements or possible exposure to heat of electronic components, etc.). For preference, the connection element(s) have a height less than 6 cm, advantageously less than or equal to 4 cm, and of at least 5 mm, and their external cross section can be inscribed inside a circle of a diameter less than 2 cm.

More particularly, at least part (or even all) of the connection elements are able to accept, advantageously removably, at least part of a support(ing) element (such as a casing or plate) that is to accept one or more accessories to be associated or, where appropriate, are able to accept at least part of an accessory that is to be associated directly. Where appropriate, the connection elements may also be associated in pairs or in groups, as illustrated later, some of these elements (or first elements) being intended to each accept at least a first part of the attached element(s) (supports and/or accessories) (and having a form or structure suited to accepting this part), and other elements (second elements) being intended to each accept at least a second part— different from the first part—of the attached element(s) (and having a form or structure, if appropriate different from that of the first connection elements, suitable for accepting this part), the connection elements associated in groups comprising where appropriate and according to the same principle, third elements, or even fourth elements, etc., according to the envisaged mode of assembly of the elements that are to be added.

According to the invention, at least one connection element, or several connection elements (or even all the connection elements where appropriate), comprises (or respectively each comprise) at least one fixing system allowing fixing (of (an) element(s) to be added) along at least two axes (particularly fixing obtained by at least two different translational and/or rotational movements) and/or two movements and/or able to exert a force oriented toward the glass-ceramic sheet (also for fixing (an) element(s) to be added). Advantageously, the element or elements to be added (which are formed separately and assembled with the sheet by means of the connectors) are also each provided with at least one fixing (or coupling or attachment) means (or member or component or part) that complements said fixing system belonging to the aforementioned connection element(s). The connection element(s) thus provided is(are) each able to accept, advantageously removably, at least the complementary fixing means of an element that is to be added (or coupled). The element that is to be added, provided with a complementary fixing means, is preferably a support element (such as a casing or plate) that is to accept one or more accessories that are to be associated, thus allowing various types of accessories, particularly commonplace accessories or accessories that do not have any special structure for assembly, to be combined as required. Alternatively, the element that is to be attached, equipped with a complementary fixing means, may also directly be an accessory, in this case having or designed to have said complementary fixing means.

The accessories that are to be associated may for example be one or more heating elements (for example induction coils), display systems, electronic boards, light sources, control interfaces or housings, sensors, wireless chargers, etc. The support element or elements may in particular take the form of plate(s) or housing(s) or casing(s), for example made of aluminum or of plastic, intended to accept the accessories that are to be coupled to the sheet, it being possible for these plates or housings, as the case may be, to be completely separated from the sheet and its connectors, or to be detached from one or more connectors at least in one part, while at the same time remaining connected in another part to other connector(s) (when the connectors are associated in groups as mentioned hereinabove), it being possible where appropriate for this (these) support element(s) to form part of the sheet and/or connector(s), or alternatively to be added if needed.

The fixing system provided on one or more connection elements is designed to allow fixing along at least two axes (particularly fixing obtained by two different translational and/or rotational movements) and/or two movements and/or in such a way as to exert a force oriented toward the glass-ceramic sheet (also for fixing element(s) to be added) and may be formed by various means and/or parts and/or elements of the connection element combined with one another in such a way as to obtain the desired fixing (along at least two axes and/or in two movements and/or with a force exerted toward the glass-ceramic sheet, these actions in particular, each or in combination, allowing the added elements to be immobilized and held in place effectively). For preference, when in particular the fixing system is designed to exert a force oriented toward the glass-ceramic sheet, the direction in which the fixing means of the element that is to be added is introduced into the connection element is advantageously different from, particularly perpendicular to, the direction of said force exerted by the immobilizing means.

The fixing system may for example be formed of at least one cavity to accept the fixing means of the element that is to be added, combined with at least one immobilizing means (which may where appropriate be removed or unlocked if need be) for immobilizing said fixing means once it is in place in the connector, said immobilizing means exerting a force oriented toward the glass-ceramic sheet, the direction in which the fixing means of the element that is to be added is introduced into the connection element preferentially being different from, particularly perpendicular to, the direction of said force exerted by the immobilizing means.

The immobilizing means may for example be formed by the combination of a pressing element such as a spring, on the outside of or inside the cylindrical shell that (in part) forms the connection element, with a stop element, such as a pin, keeping the spring in compression once the fixing means of the added element has been introduced into a cavity of the connection element, as illustrated later, the removal of the pin subsequently potentially allowing the added element to be extracted if need be.

The immobilizing means may also as an alternative be a magnet (the fixing means of the added element in that case being made from a suitable material such as a ferromagnetic material), or alternatively may be a part or a component of the connection element that is made from a material that can be attracted by a magnet, such as a ferromagnetic material, the fixing means of the added element then comprising a magnet or a magnetized part.

The fixing system may also for example be an end of the connection element (in particular the opposite end to the one in contact with the glass-ceramic sheet or a lateral end) which is threaded or provided with a system (for example of notches) that allows fixing of the bayonet or sliding pivot type, this end allowing the fixing (by bayonet fixing/sliding pivot fixing or screw-fastening) along at least two axes and/or in two movements of an attached additional element, it thus being possible for the added element to be inserted or extracted only by performing one or more movements along at least two axes (particularly translational and rotational movements) and/or two movements, rather than by performing a simple insertion or, conversely, by pulling, in just one direction.

As previously indicated, the glass-ceramic sheet to which the connection element(s) are fixed is advantageously monolithic (or monoblock or made as a single piece), particularly essentially planar, and has a thickness less than 15 mm, particularly less than 12 mm, in particular less than or equal to 6 mm, and a coefficient of expansion less than $30 \times 10^{-7}$ $K^{-1}$ between 20 and 400° C. (and preferably less than $13 \times 10^{-7}$ $K^{-1}$ between 20 and 400° C.).

The presence of the connectors and accessories advantageously on the lower face makes it possible where appropriate to hide unattractive elements, to offer a visible surface with easy upkeep and to guarantee better durability of the accessories of the sheet etc. The glass-ceramic sheet thus offers a surface that is predominantly continuous/uniform/free of connections, attractive, and of easy upkeep. It may be provided with decorative or functional coatings of small thickness (in particular of the order of a few tens of nanometers to a few hundred microns, or even more), for example made of enamel, paint, thin layers, etc., and/or with other elements, which may or may not be attached to the aforementioned connectors.

Where appropriate, the sheet may have a surface area (which corresponds to the product of its length and its width) on its face of largest dimensions which is intended to be visible and act as a support for (household or work) items with dimensions greater than 0.4 $m^2$, in particular greater than 0.7 $m^2$, or even greater than 1 $m^2$, particularly greater than or equal to 2 $m^2$, for use as a worktop or a surface of a furniture unit. The sheet also preferably in this case has one and/or other of the following characteristics (the limits given being included): Young's modulus of between 80 and 100 GPa (measured according to the ASTM C 1259 standard), flexural strength of between 110 and 220 MPa (measured by a ring-on-tripod test, on a 70 mm×70 mm×4 mm sheet, the sample resting on three 9.5-mm diameter balls positioned at the vertex of an equilateral triangle inscribed in a 40-mm diameter circle, a force being applied to the center of the sample by a 10-mm diameter ring with an advance of 5 mm/min, the results being interpreted with the Weibull model described in: "A statistical distribution of strength of Materials", Royal Swedish Institute For Engineering Research, W. Weibull, Stockholm 1939, 1-45, the data obtained, also referred to as a "scale factor", revealing the average rupture stress and resulting from the analysis by the Weibull method of the flexural modulus of rupture (MOR) measurements, being expressed in MPa), thermal conductivity of less than 2 W/m·K (measured in particular according to the DIN 51936 standard), resistance to thermal shocks of between 250° C. and 700° C., density of between 2.3 and 2.7, resistance to acids of between 0 and 2 mg/cm$^2$ (measured according to the DIN12116 standard), and resistance to bases of between 0 and 1 mg/cm$^2$ (measured according to the ISO 695 standard).

The glass-ceramic sheet used is preferably flat (or predominantly or virtually flat) and in particular has a flatness (height between the highest point and the lowest point of the substrate, with respect to the mean plane of the substrate, excluding any possible deliberate deformations produced on the substrate for esthetic or functional purposes) of less than 0.1% of the diagonal of the substrate, and preferably of less than 3 mm, in particular of less than 2 mm and in particular of less than 1 mm, or even of about zero, depending on the size/surface area/diagonal of the substrate, the flatness being measured using a SurFlat waviness meter sold by Visuol. It is generally of geometric shape, in particular rectangular, indeed even square, or even circular or oval, etc., and generally exhibits a face which is "upper" (face which is visible) in the position of use, another face which is "lower" (generally hidden, in a framework or carcass) in the position of use, and an edge face (or edge or thickness). The upper face is generally flat and smooth but may also exhibit at least one protruding zone and/or at least one recessed zone and/or at least one opening and/or beveled edges etc., these variations in shape advantageously constituting continuous variations in the sheet (with no change in materials or joins). The lower face is preferably smooth, or indeed provided with bumps (in which case the connectors can be bonded using an adhesive which then also acts as a filler, or the sheet comprises another suitable filler such as a resin or a self-leveling film).

The thickness of the glass-ceramic sheet is generally at least 2 mm, in particular at least 2.5 mm, particularly of the order of 3 to 15 mm.

The glass-ceramic may be in a dark color (black, dark brown) or a pale color (white, cream) and may be translucent or opaque or transparent depending on the desired use and the desired look. It is in particular a lithium aluminosilicate glass-ceramic. It may in particular be refined with arsenic (that is to say, have (a parent glass with) a composition comprising of the order of 0.5% to 1.5% by weight of arsenic oxide (expressed as $As_2O_3$)) or may not be refined with arsenic (in particular having a content of arsenic oxides of less than 0.2%, in particular of less than 0.1%, or even zero) or refined with tin or refined with sulfide(s), and may be obtained by rolling or by the float process.

As indicated hereinabove, the sheet may where appropriate comprise various functional and/or decorative coatings, in particular from among those generally used with glass-ceramics, for example coatings based on enamel, on paint, on thin (for example metal, dielectric, etc.) layer(s), etc. For example, one of the faces may comprise one or more enamel layers or one or more enamel patterns having a decorative purpose and/or in order to signal one or more elements (displays, etc.) and/or acting as masking (for example to prevent light sources from being seen directly) and/or for other functions (as light extractor or to render illumination uniform, etc.). The sheet may also be provided with a functional layer giving it one or more additional properties, such an scratch resistance, mechanical strength, non-marking, overspill prevention, etc., it being possible in particular for the coating or coatings to be on the visible face or on the opposite face, depending on the type of coating and the desired function.

The sheet may be equipped, particularly and advantageously by the connectors, with various elements (or accessories) allowing various uses so as in particular to form an interactive and modifiable unit or worktop.

For example, it may be equipped with one or more light sources, in particular formed by light-emitting diodes and intended for example to embody (render visible) one or more regions or one or more elements or displays of the sheet, in particular by transmission of light through the sheet. These sources may in particular make it possible to display controls (in the form of keys, logos, or even keypads, etc.) which can for example be activated by contact on the surface of the sheet (using, for example, sensors located under the surface and which may likewise be attached using the connectors) or remotely (in particular by wireless communication), indeed even by simple movement of the hand (by sensors located, if appropriate, on the outside and which record the movement, for example by triangulation, in order to convert it, in particular using a suitable algorithm and a suitable interface, into the activation of a function, for example), or, if appropriate, by placing a predetermined object at a predetermined location on the sheet. The light source(s) may also make it possible to display decorations or various data (to display, for example, computer pages, cooking recipes, etc.) downloaded, for example, by wireless communication using an appropriate interface and projected or transmitted from the light sources onto the surface of the sheet.

The sheet may also be equipped with one or more heating elements, such as induction coils, radiant elements, which also can be actuated in various ways as described for the light sources, and may also be equipped with communications interface(s) with at least one adjacent element (for example light sources or heating elements) and/or if appropriate with at least one external element, for example with an external module for wireless communication, said interface(s) being for example a control unit, a tablet or a touch-screen, a system of the Bluetooth, WLAN, wifi, RFID chip, Lifi, etc. type.

The sheet may also be equipped with other elements, such as one or more waveguides, and with various other components, particularly electrical and/or electronic components, such as a charger (for example for a telephone, induction coil, etc.), one or more leads, an audible or vibrating component (which for example signals that an object of the saucepan type is approaching), etc.

The solution afforded by the present invention is particularly advantageous, as mentioned hereinabove. The small dimensions of the connection element or elements and the possibility of positioning them at various locations, combined with the choice of materials used and the modes of fixing selected for attaching the accessory or accessories to be coupled at a distance that allows them to perform whatever function they might without the risk of damage to said accessories by rubbing or by heat make it possible to offer a solution to the stated problem that is suitable for all types of glass-ceramic sheet and make it possible to envision fitting and/or removing various types of accessories without the need for complex installations or tooling and without the need to handle the sheets, particularly those of significant dimensions and weight. The product developed according to the invention thus meets the desired objective by proposing a mode of assembly that allows various types of elements to be connected at various points on the sheet, removably where appropriate, without the installation presenting problems of space or of interference with certain accessories combined with the sheet (such as any heating elements there might be, be these radiant or of the induction type), and while at the same time allowing the associated accessories to perform their function in combination with the sheet (such as to illuminate heating regions or to display data using elements added underneath the sheet, etc.), the proposed solution also, where appropriate, allowing the accessories to be exchanged as required or according to the intended purpose of the sheet.

The sheet according to the invention is manufactured in particular from glass-ceramic sheets, particularly of large dimensions, obtained by ceramization, in particular by bonding the connection element(s) to the surface of the glass-ceramics using a thermosetting adhesive.

For the record, glass-ceramic sheets are generally manufactured as follows: glass with the composition chosen for forming the glass-ceramic is melted in a melting furnace, the molten glass is then rolled to give a standard ribbon or sheet by passing the molten glass between forming rollers, and the glass ribbon is cut to the desired dimensions. The sheets, which may or may not be already cut, are then ceramized in the way known per se, ceramization consisting in firing the sheets according to the chosen temperature profile in order to convert the glass into the polycrystalline material referred to as "glass-ceramic" the expansion coefficient of which is zero or near zero and which is resistant to thermal shock of as much as 750° C. (or indeed even more). Ceramization generally comprises a step in which the temperature is raised progressively to the nucleation domain, generally situated around the glass transformation domain, a step in which the nucleation temperature range is crossed in a few minutes, a further progressive increase in temperature up to the ceramization hold temperature, holding the ceramization hold temperature for several minutes, followed by rapid cooling down to ambient temperature.

In order to obtain large-sized sheets according to the invention, particularly sheets with a surface area greater than 0.7 m2, the speed of passage during the ceramization cycle is preferentially reduced by at least 25%, preferably by at least 50%, or the length of the ceramization lehr or the residence time in said lehr is increased by at least 25%, preferably by at least 50% with respect to the speed, length or residence time respectively that are optimal or common practice for obtaining a ceramic-glass substrate that has a surface area smaller than 0.4 m$^2$.

If appropriate, the process also comprises a cutting operation (generally before ceramization), for example with a water jet, mechanical scoring with a cutting wheel, etc., followed by a shaping operation (grinding, beveling, etc.). The process can also comprise a step of rolling or sag bending in order to form specific protrusions.

The present invention also relates to a method for assembling (or mounting or fixing) an added element or an accessory on the sheet previously defined according to the invention, whereby the added element or the accessory is mounted, advantageously removably, on at least one connection element of the sheet by performing one or more movements (of said added element with respect to the connection element) along at least two different axes (or in at least two different directions) and/or by performing at least two movements, particularly translational and/or rotational movements (in particular translational and rotational), for example at least one screw-fastening or a mounting by bayonet or sliding pivot, and/or by exerting a force, on at least part of the added element, which force is oriented toward the glass-ceramic sheet, the direction in which (the fixing means of) the element that is to be added is introduced into the connection element preferably being different from, particularly perpendicular to, the direction of said force.

Other advantageous features and details of the invention will emerge below from the description of nonlimiting embodiments of the invention, with reference to the appended drawings, in which:

FIG. 3b depicts an alternative form of the embodiment of FIG. 3a.

Figure 1A:
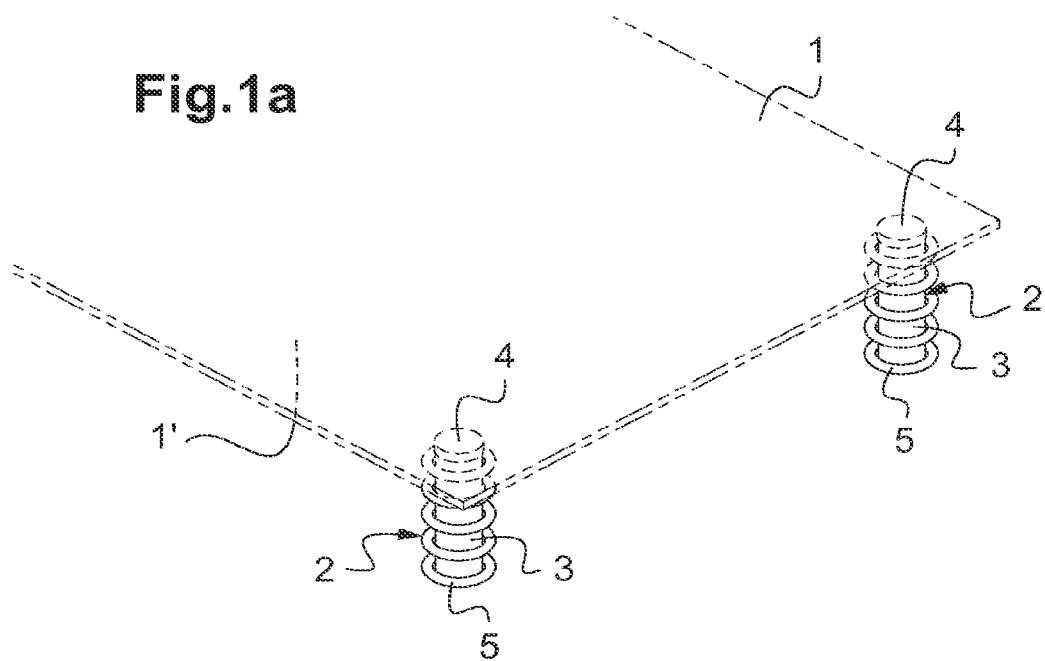
FIG. 1a depicts a schematic view in perspective (viewed from above) of a sheet according to the invention according to a first exemplary embodiment.

The same references are used throughout the figures to denote the same types of element.

In each of the aforementioned figures, the sheet (1) according to the invention is a monolithic sheet of glass-ceramic (for example a sheet of the kind marketed by the Eurokera company under the reference KeraBlack+), this sheet having an upper face and a lower face which are smooth, and having for example a thickness of 6 mm and a surface area of 0.78 m$^2$, and being in particular obtained by a procedure like that of patent WO 2012156444, reducing the speed of passage through the ceramization lehr by 50% in order to obtain said large-sized sheet without any flatness defects.

In each embodiment illustrated, the glass-ceramic sheets (1), in particular intended to act as the surfaces of units or as large worktops, are equipped, on their lower face (1'), with several connection elements (2) each one comprising at least one shell or cylindrical body (3), which in particular is hollow or semi-hollow, each connection element being bonded under the underside (or the face that is lowermost in the position of use) of the sheet by means of a thermosetting adhesive (4) (not visible/not depicted in FIGS. 2a and 2b but present at the base of the connectors between the connectors and the sheet) that has a coefficient of expansion of less than $900 \times 10^{-7}$ K$^{-1}$ between −40 et 80° C. and a shear strength greater than 10 N/mm$^2$, such as an epoxy-type adhesive marketed by the Henkel company under the reference Loctite EA 9492, or a cyanoacrylate-type adhesive marketed by the Henkel company under the reference Loctite 480.

Figure 1B:
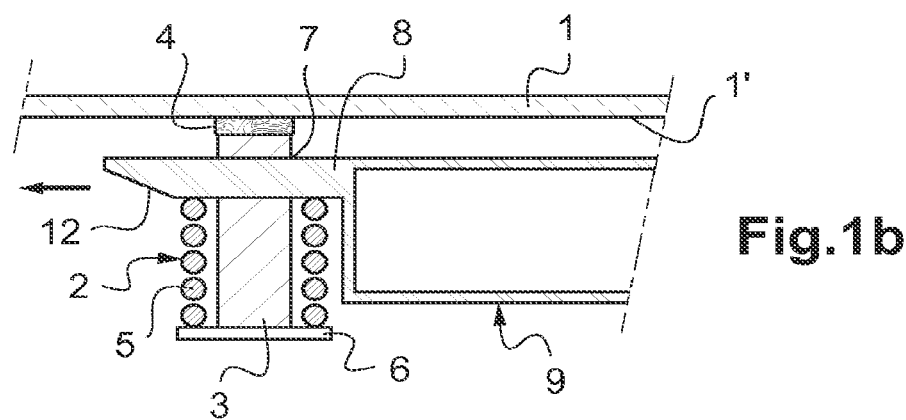
FIG. 1b depicts a schematic cross section of said sheet along the axis of one of the connection elements depicted in FIG. 1a when a support element that is to accept one or more pieces of equipment or accessories that are to be associated is added and fixed to the sheet using the connection element.
Figure 1C:
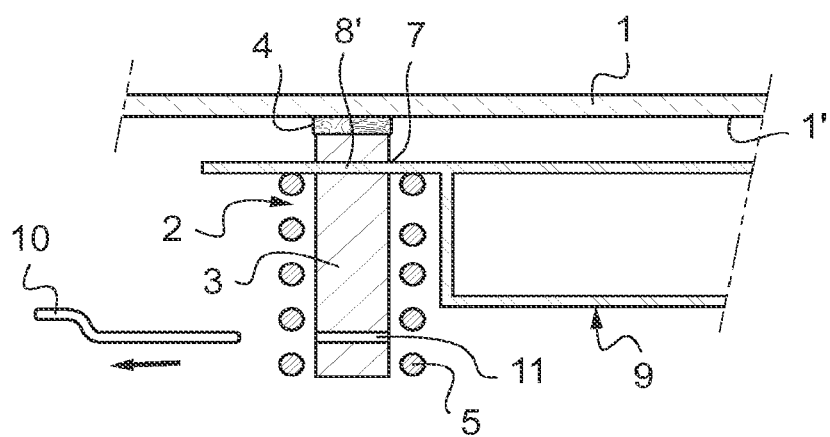
FIG. 1c depicts a schematic cross section of an alternative form of FIG. 1b, this time when a support element previously fixed using a connection element is being removed.

In the first embodiment illustrated in FIGS. 1a to 1c, the sheet is equipped with several identical or similar connection elements (2) (two of these are depicted in FIG. 1a, it being possible for these elements to be situated at any point under the sheet, it being possible for the outlines of the sheet to extend beyond those depicted schematically in FIG. 1a), each one formed of at least a cylindrical body (3) with a diameter of 10 mm and a height of 4 cm, for example made from a non-magnetic material such as aluminum, and at least one spring (5), for example made of stainless steel, having, for example, a free length of 34 mm and a maximum force of 48 N, fixed to said cylindrical body (for example fixed on the outside or the inside of the cylindrical body or on a base (6) likewise fixed, permanently or removably, on the cylindrical body). The cylindrical body has a transverse opening (7), for example through-opening, approximately 3 mm from the lower face of the sheet, so that a part (8, 8') of a support element (9), of suitable dimensions for being able to be housed in this opening, can be inserted therein.

The support element (9) takes, for example, the form of a rectangular aluminum or plastic casing measuring 19×26 cm and with a (side wall) thickness of 12 mm, and is intended to accept one or more pieces of equipment or accessories such as induction coils, an electronic unit, etc. The part (8, 8') of said support element constitutes a complementary fixing means of the fixing system provided in each connection element, said fixing system being for example formed by the combination of the spring (5) and of the opening (7) in the embodiment of FIG. 1b (it also being possible for the base to form part of this fixing system), or being formed by the combination of the spring (5), of the opening (7), of a pin (10) and of a transverse second through-opening (11) toward the lower end of the connection element in the embodiment of FIG. 1c.

Thus, in the embodiment of FIG. 1b, when the support element bearing the equipment or accessories is being fitted, the particular shape of the end (12) of this part (8) (or fixing means (8)) of the support element (9) allows it to be introduced (in the direction of the arrow) into the opening (7) of the connector (2) while at the same time progressively compressing the spring (5) as far as a position in which the spring immobilizes said part by exerting a force on said part, this force exerted by the spring of the connection element being perpendicular to the direction of insertion of the added element (9) and being exerted in the direction of the sheet according to one of the modes of fixing according to the invention. If the equipment needs to be removed or changed, the support element can be removed by pulling in the opposite direction to the direction of insertion, thus releasing the spring and the support element.

In the alternative form illustrated in FIG. 1c, which also depicts one mode of removable fixing, when the support element bearing the equipment or accessories is being fitted, the part (or fixing means) (8') of the support element (9) is introduced into the opening (7) of the connector (2), and then a pin (10) is introduced into the opening (11) at the bottom of the connector, compressing the spring (5) so that the spring immobilizes the part (8') of the support element while exerting a force on said part, perpendicular to the direction of insertion of this part and in the direction of the sheet according to one of the modes of fixing according to the invention. If the equipment needs to be removed or changed, the support element can be removed by pulling on the pin (in the direction indicated by the arrow), thus releasing the spring and the support element which can be removed.

If appropriate, the base (6) in FIG. 1b may also act as a removable pin and form part of the fixing system of the connector.

In another embodiment, the lateral opening (7) or the opening at the free end of the element (at the site of the base (6)) may also be replaced by at least one notch of a shape that allows fixing by bayonet or sliding pivot, the part (8, 8') of the support element then being provided with at least one complementary shape that can engage in the notch in a first movement and be immobilized in said notch by a second movement (be fixed by movements of the push-and-turn type in particular), or can be replaced by a screw thread, the part (8, 8') of the support element then being able to be screwed around said screw thread, fixing in both of these alternatives then being according to two different movements and/or axes, using translational and rotational movements, according to another mode of fixing according to the invention.

Figure 2A:
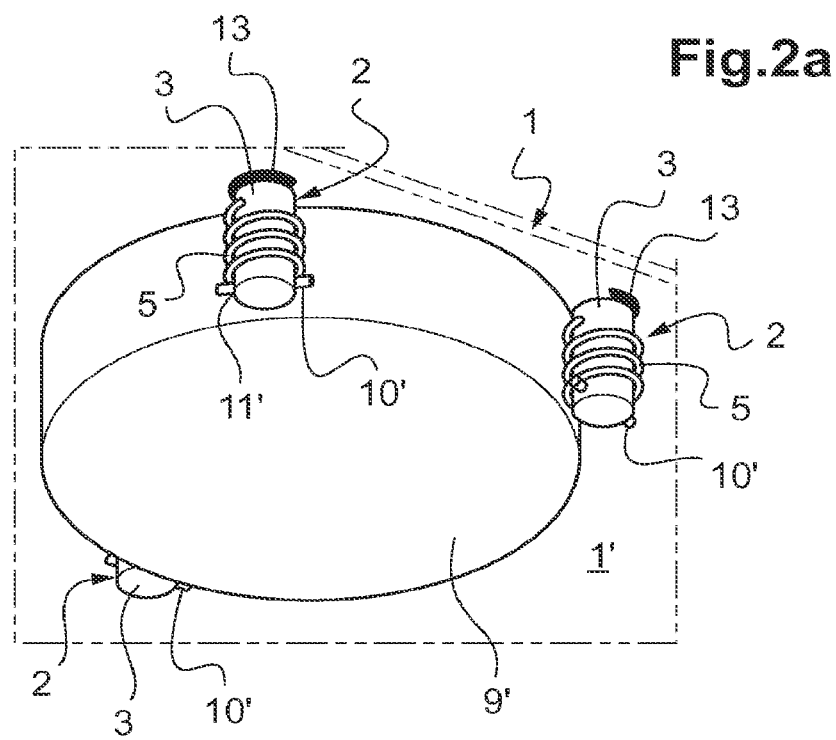
FIG. 2a depicts a schematic view (from beneath) of an alternative form of the previous embodiment, with a support element (receiving one or more pieces of equipment or accessories, not depicted, that are to be associated) fixed to several connectors.
Figure 2B:
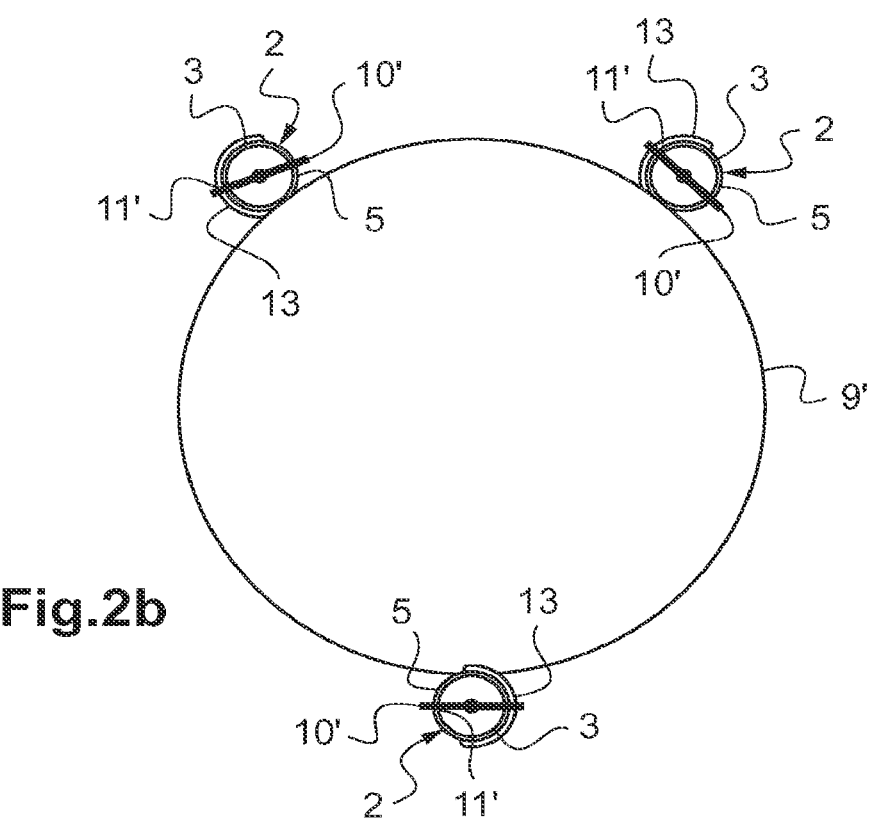
FIG. 2b depicts a view from beneath of the connection elements depicted in FIG. 2a with the support element fixed to said elements.

In the embodiment or alternative form illustrated in FIGS. 2a and 2b, the sheet is equipped with identical or similar connection elements (2) which are associated in groups of three, each being formed as in the previous embodiment of a cylindrical body (3) and of a spring (5) (for example made from the same material and having the same dimensions as before) fixed to said cylindrical body.

The support element (9') for example takes the form of a round casing 21.5 cm in diameter, made of polycarbonate, and is intended to accept one or more pieces of equipment or accessories such as induction coils, an electronic unit, etc. This casing is provided with three external hooks (13) constituting fixing means that complement the fixing systems provided in the connection elements, each of said fixing systems being formed for example of the combination of the spring (5), of a pin (10') and of a transverse through-opening (11') toward the lower end of the connection element.

Thus, when the support element (9') bearing the equipment or accessories is being fitted, said support element is brought in from underneath between the connectors (2), with the hooks positioned between the connectors, then the support element is pivoted so that each hook simultaneously fits around one of the connectors. A pin (10') is then introduced into each of the connectors into the opening (11') provided at the bottom of each of the connectors, compressing the associated spring (5) so that the spring locks the relevant hook by exerting on said hook a force in the direction of the sheet thus immobilizing the support element in its position, the force also being perpendicular to the direction in which said hook was introduced (or brought in). If the equipment needs to be removed or changed, the support element can be removed by pulling on the pins, thus releasing the springs and by performing the reverse (rotational and translational) movements.

Figure 3A:
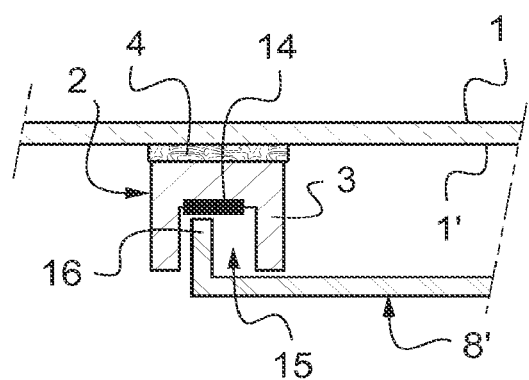
FIG. 3a depicts a schematic cross section of a third exemplary embodiment of a sheet according to the invention.
Figure 3B:
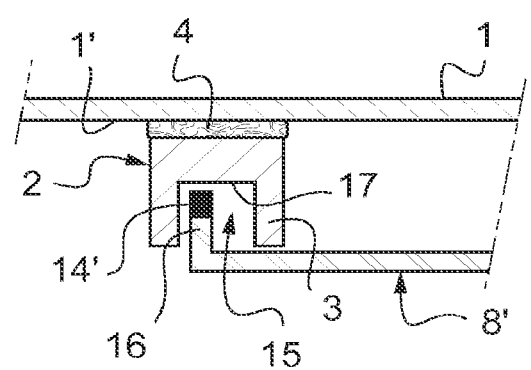

In the third embodiment illustrated in FIGS. 3a and 3b which likewise depict one mode of removable fixing, the sheet (1) is equipped with several identical or similar connection elements (2), each one formed of at least one cylindrical body (3), hollow at its base, 2 mm in diameter and 10 mm in height, for example made of a non-magnetic material such as aluminum, and of at least one magnet (14) fixed (for example by adhesive bonding or insetting) in the cavity (15) at the base of the connector (2).

The support element intended to accept one or more pieces of equipment or accessories takes for example the form of a casing or housing made of aluminum or of plastic and has a part (8') with an end (16) able to become housed in the cavity (15) of the connector, this end being formed for example of, or coated with, a ferromagnetic material and forming a fixing means complementing the fixing system provided in each connection element, said fixing system being formed for example by the combination of the cavity and of the magnet, the magnet exerting a force on the part (16) in the direction of the sheet according to one of the embodiments of the invention.

In the alternative form in FIG. 3b, the magnet/the magnetized part (14') is situated this time on the end (16) of the support element associated with the connection element, the connection element in this instance having a cavity interior surface (17) made of a ferromagnetic material, for example said interior surface being coated with a ferromagnetic foil, bonded if appropriate to said surface, or with a paint based on magnetic particles, fixing taking place between the end (16) of the support element and the connection element with a force oriented toward the glass-ceramic sheet.

In another alternative form, the cavity (15) or a lateral part of the connection element (2) may also be designed so that it has a profile that allows fixing by bayonet or sliding pivot, the part (8', 16) of the support element then being provided with at least one complementary shape that can engage in this part of the connection element in a first movement and be immobilized by a second movement (movements of the push-and-turn or translation-rotation type), or a screw thread may be provided at the site of the cavity or on a lateral part of the connection element, the part (8', 16) of the support element then being able to be screwed around said screw thread, fixing in both of these alternatives then being according to two different movements and/or axes, according to another mode of fixing according to the invention.

The sheet according to the invention may in particular be used to advantage to produce a new range of cooking devices or (furniture) units.

The invention claimed is:

1. A glass-ceramic sheet in particular for a surface of at least one of a furniture unit and as a worktop, comprising:
    at least one connection element on a lower face of the glass-ceramic sheet, the at least one connection element having a height less than 10 cm and of which the cross section can be inscribed inside a circle of a diameter less than 3 cm,
    wherein said connection element is made from a material able to withstand at least 70° C.,
    wherein the connection element includes at least one fixing system allowing fixing to the connection element along at least two axes or in at least two movements or both, obtained by at least two different translational or rotational movements, or able to exert a force directed toward the glass-ceramic sheet or both,
    wherein at least part of said connection element is configured to removably accept at least one or more support elements to be added,
    wherein the one or more support elements to be added are each provided with at least one fixing portion that complements the fixing system belonging to said connection element, and
    wherein a direction in which the complimentary fixing portion of the support element that is to be added is introduced into the connection element is perpendicular to a direction of the force exerted by the fixing system directed toward the glass-ceramic sheet.

2. The glass-ceramic sheet as claimed in claim 1, wherein said connection element has a height less than 6 cm, advantageously less than or equal to 4 cm, and a cross section that can be inscribed inside a circle of a diameter less than 2 cm.

3. The glass-ceramic sheet as claimed in claim 1, wherein said connection element includes one or more parts and has the external appearance of a cylindrical stud or pin, including one or more hollowed parts or equipped with one or more other external or internal constituent components.

4. The glass-ceramic sheet as claimed in claim 1, wherein said connection element is formed, at least in part, of refractory or non-magnetic material(s) or both.

5. The glass-ceramic sheet as claimed in claim 1, the sheet comprising:
    a plurality of connection elements positioned under the lower face of the sheet.

6. The glass-ceramic sheet as claimed in claim 1, wherein the one or more support elements are configured to accept at least part of an accessory that is to be associated with the support element.

7. The glass-ceramic sheet as claimed in claim 1, wherein the one or more support elements are the casing or plate type, configured to accept one or more accessories, the one or more accessories including heating element(s), display system(s), electronic board(s), light source(s), control unit(s) or interface(s) or sensor(s) type.

8. The glass-ceramic sheet as claimed in claim 1, wherein the fixing system includes at least one pressing element with a stop element keeping the pressing element in compression once the fixing portion of the added element has been introduced into the connection element.

9. The glass-ceramic sheet as claimed in claim 1, wherein the fixing system includes at least one magnet.

10. The glass-ceramic sheet as claimed in claim 1, wherein the fixing system is formed at least by an end of the connection element which is threaded or provided with a system that allows fixing of the bayonet or sliding pivot type, this end allowing the fixing, along at least two axes or in two movements or both, of an attached additional element.

11. The glass-ceramic sheet as claimed in claim 1, wherein said sheet is a monolithic sheet having a thickness of less than 15 mm, an expansion coefficient of less than $30 \times 10^{-7}$ $K^{-1}$ between 20° C. and 400° C., and a surface area of greater than or equal to 0.7 $m^2$.

12. An item of at least one of furniture and household equipment, particularly a worktop or furniture unit, comprising at least one glass-ceramic sheet as claimed in claim 1.

13. The item of at least one of furniture and household equipment as claimed in claim 12, wherein said sheet occupies at least 50% or even all of the top face of said item of at least one of furniture and household equipment, and is mounted horizontally on one or more support elements so as to offer a continuous stable surface intended for various uses.

14. The item of at least one of furniture and household equipment as claimed in claim 12, wherein said sheet is equipped with accessories or equipment of the heating element(s), light source(s), audible or vibrating component(s), display system(s), electronic board(s), control unit(s) or interface(s) or sensor(s) type.

15. A method for assembling an added element or an accessory on the sheet as claimed in claim 1, the method comprising mounting the added element or the accessory on at least one connection element of the sheet by performing one or more movements along at least two different axes or by performing at least two movements or both, wherein the at least two movements are at least one of translational and rotational movements, the two movements including at least one screw-fastening, a mounting by bayonet or sliding pivot, and by exerting a force, on at least part of the added element, the force being oriented toward the glass-ceramic sheet.

16. The glass-ceramic sheet as claimed in claim 8, wherein the pressing element is a spring, and the stop element is a pin.

* * * * *